United States Patent [19]

So

[11] Patent Number: 5,523,704
[45] Date of Patent: Jun. 4, 1996

[54] METHOD AND CIRCUIT FOR ACTIVELY CONTROLLING THE TRANSITION IMPEDANCE OF MULTIPLEX COMMUNICATIONS NODES

[75] Inventor: Lingkon So, Niskayuna, N.Y.

[73] Assignee: Ford Motor Company, Dearborn, Mich.

[21] Appl. No.: 131,170

[22] Filed: Oct. 4, 1993

[51] Int. Cl.⁶ .................................................. H03K 17/16
[52] U.S. Cl. .............................. 326/30; 326/21; 333/22 R
[58] Field of Search ............................... 326/30, 21, 18, 326/90; 375/257; 333/22 R, 124–125

[56] References Cited

U.S. PATENT DOCUMENTS

| | | |
|---|---|---|
| 2,863,123 | 12/1958 | Koch . |
| 3,832,575 | 8/1974 | Dasgupta et al. . |
| 3,937,988 | 2/1976 | DeClue et al. . |
| 4,345,171 | 8/1982 | Harris, Jr. . |
| 4,748,426 | 5/1988 | Stewart . |
| 4,831,283 | 5/1989 | Newton . |
| 4,943,739 | 7/1990 | Slaughter . |
| 4,970,419 | 11/1990 | Hagen et al. . |
| 4,994,690 | 2/1991 | Sundstrom et al. . |
| 5,050,187 | 9/1991 | Ichie .......................................... 375/257 |
| 5,313,105 | 5/1994 | Samela et al. ............................ 326/30 |

OTHER PUBLICATIONS

SAE Recommended Practice J1850 Class B Data Communication Network Interface May 11, 1993.

Primary Examiner—Edward P. Westin
Assistant Examiner—Jon Santamauro
Attorney, Agent, or Firm—Richard D. Dixon; Roger L. May

[57] ABSTRACT

A method and circuit for actively controlling the transition resistance of a multiplex communication signal line having a known termination resistance and characterized by digital signals defined by dominant and recessive states between a voltage source and a ground potential. The digital signal is sensed at the node when it moves through a transition band defined between the dominant and recessive states. The effective terminator resistance at the node along the signal line is reduced only responsive to the digital signal level being within the transition band, whereby the transition time for the signal to travel through the transition band is reduced by reducing the effective resistance and therefore the effective RC time constant at the node.

10 Claims, 2 Drawing Sheets

METHOD AND CIRCUIT FOR ACTIVELY CONTROLLING THE TRANSITION IMPEDANCE OF MULTIPLEX COMMUNICATIONS NODES

BACKGROUND OF THE INVENTION

1. Field of the Invention

This invention relates to a method and circuit for actively controlling the impedance along the lines of a multiplex communication circuit, and more specifically for reducing the effective resistance and resulting time constant at a multiplex node in order to improve response time and increase digital transmission speeds (Kbps).

2. Description of the Prior Art

A vehicle-wide network multiplex communication system based upon the Society of Automotive Engineers (SAE) J1850 standard, which is incorporated herein by reference, may be optimized for providing communications for a variety of applications within automotive vehicles. Examples of these applications include low-speed body electrical signals, and medium speed data communication signals between control computers and between control computers and displays. One preferred embodiment of the J1850 standard operates at 41.67 Kbps. The physical layer is implemented as a multiplex wiring system, as illustrated in FIG. 1, composed of a variety of modules connected together by two twisted wires for communicating with differential pulse width modulation signals. Other modulation and digital encoding schemes such as NRZ (nonreturn to zero) may also be used in conjunction with this invention. The two wire differential twisted pair is preferred because of its high degree of immunity to electromagnetic noise.

Signals are transmitted differentially, with the signal on one line being the complement of the signal on the other line. The digital messages are encoded in a series of states consisting of a dominant or active state, which may be either a positive voltage or a negative voltage depending upon the polarity and signal protocol, and a recessive or passive state where the line voltage is established by the termination resistors. FIG. 2 illustrates a preferred pulse width modulation protocol for digitally encoded 0 and 1 bits according to one implementation of SAE J1850.

As the need for real-time information exchange among the various computers and control systems of the automotive vehicle increases, it is desirable to increase the speed from 41.67 Kbps to speeds such as 167 Kbps, 333 Kbps and 1,000 Kbps. In the SAE J1850 standard protocol, the most critical event occurs during the acknowledgement procedure whereby one node acknowledges to the originating node that a message has been received. The multiplex system must be able to arbitrate acknowledgements between two message recipients whose transmitted acknowledgements are separated by a time delay. The time delay allowed before arbitration fails is defined as the maximum allowable delay for a signal traveling within the system. This maximum allowable time delay is inversely proportional to the data rates of the digital signals. Therefore, in order to operate at higher data rates, the total time delay must be minimized to the extent possible.

The one way time delay for message transmission is made up of the following elements: (1) the propagation delay along the transmission line, (2) the propagation delay of the line driver, (3) the RC time constant of the receiver input filter, and (4) the combined RC time constant of the transmission line and nodes. The RC time constant of the receiver input filter is determined by the level of filtering desired for anti-aliasing. As the speed of the multiplex system is increased, the time constant must be reduced proportionately.

The combined RC time constant of the multiplex communication lines and the nodes is determined by the total length of the transmission line, the total number of nodes in the system, and the value of the terminator resistors. For a 40 meter system with 32 nodes, each having a capacitance of 250 pf from each line to ground and line capacitances of 67.5 pf/m between lines and 40 pf between line and ground, and terminator resistors equal to 90 ohms, the RC time constant is approximately 1.1 microseconds which corresponds to about 650 nsec in signal delay. Any possible reduction in the delay due to the RC time constant has a significant effect on increasing the maximum operating speed of the system because it represents nearly half of the total system delay.

The maximum allowable time delay is equal to the sum of the delay of the message from the sender to the receiver, plus the delay of the acknowledgement from the receiver to the sender. In order to determine the maximum allowable delay, the line RC time constant delay must be added with the other delay factors described above. The maximum delay occurs when the delay between two acknowledging messages is large enough to cause the trailing edge of the first phase of one message to be sampled during the second phase of the other message or the second phase being sampled during the third phase, such that an incorrect acknowledgement occurs in the former case and an error condition occurs in the latter case.

The signal waveform illustrating the effect introduced on the square waveform by the slow RC time constant is shown in trace B of FIG. 6. Trace A of FIG. 6 illustrates the desired waveform that will be produced by the variable impedance reduction controlled by the preferred embodiment of the present invention.

Therefore, a first object of the present invention is to dynamically reduce the effective resistance at each node of the multiplex system in order to decrease the RC time constant during the signal transition for allowing a more rapid slew of the signal from one logic state to another. Another object is that the active circuitry utilized for the impedance reduction must be inactive outside of a transition band between the two basic states so as to not change the termination resistance when the signal is in either the full active (dominant) or passive (recessive) state.

SUMMARY OF THE INVENTION

The present invention is directed toward a method for actively terminating nodes of a multiplex communications system located along a signal line, having a known terminator resistance, that transmits digital signals defined by dominant and recessive logic states between first and second voltage potentials. The method includes the steps of sensing the transition of the digital signal within a transition band defined between but not including the dominant and recessive logic states, and then reducing the effective terminator resistance at the node along the signal line only responsive to the digital signal level being within the transition band. In this manner, the transition time for the signal to slew through the transition band from one logic state to the other is reduced by reducing the effective resistance and, therefore, the effective RC time constant at the node. A circuit for implementing this method is also disclosed.

IN THE DRAWINGS

Other objects, features and advantages of the present invention will be apparent from a study of the written descriptions and the drawings in which.

DESCRIPTION OF THE PREFERRED EMBODIMENT

Figure 1:
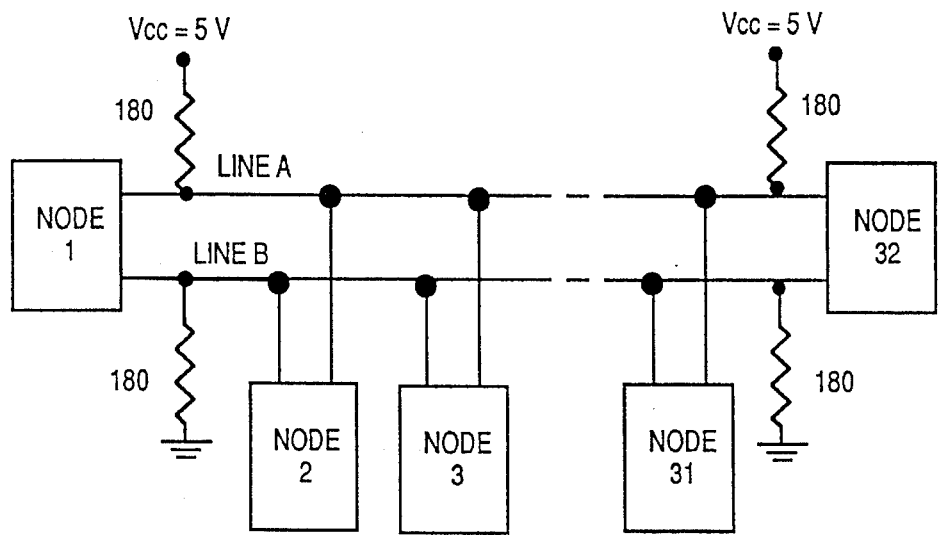
FIG. 1 is a schematic block diagram representation of a multiplex communication system of the type in which the present invention may be utilized.
Figure 2:
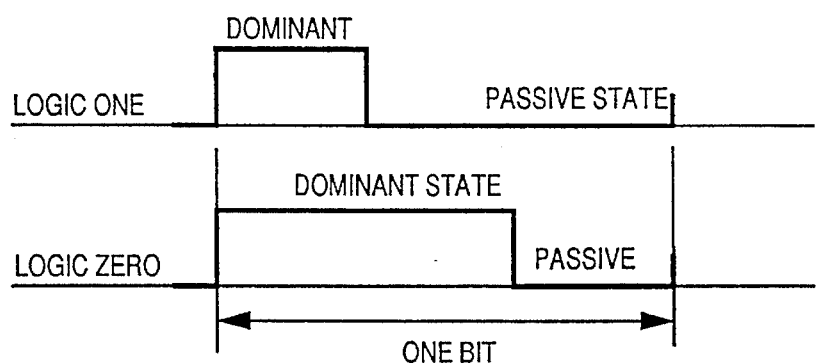
FIG. 2 illustrates the dominant and recessive logic states for the logic 1 and logic 0 signal waveforms of the pulse width modulation multiplex communication protocol utilized in accordance with the present invention.

A schematic block diagram of the multiplex communication system in accordance with the present invention is illustrated in FIG. 1 as including a supply voltage ($V_{cc}$) of five volts, and nodes 1 through 32 having termination resistances of 180 ohms at the two farthest nodes in the system. The equivalent circuit used for calculating the RC time constant for the preferred embodiment is illustrated generally in FIG. 3 as having an equivalent terminator resistance of 90 ohms, a load capacitance of $C_{ng+wg}$, and a cross-line capacitance of $C_{nn+ww}$.

In a multi-master, digital multiplex network, a contention based arbitration procedure is required in order for each node in the network to gain control of the signal line during transmission. The control hierarchy is based on the priority assigned to each node or message format. The first preferred embodiment of the present invention, which is designed and operated in accordance with the SAE J1850 standard, includes a multi-master network utilizing carrier sense multiple access with collision detection (CSMA/CD) and bit-wise arbitration. This arbitration procedure requires each transmitter to release the signal line when it is in a recessive or passive state. This allows another transmitter in a dominant or active state to control the line.

Figure 3:
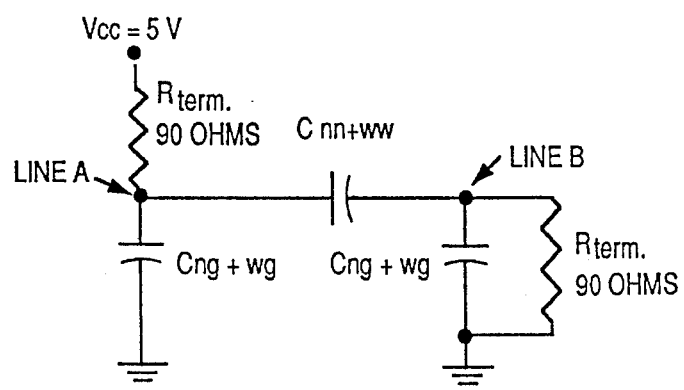
FIG. 3 illustrates lumped sum electrical equivalent components of the multiplex communication lines.

When the line transitions between the active and passive states, the voltage on the line does not change instantaneously due to the combined capacitance of the line and the input/output capacitances of the transceivers connected to each node of the network. With reference to FIG. 3, the line voltage is determined by the voltage on the equivalent capacitance $C_{ng+wg}$ as it charges up to (as in the case of line A) or discharges through (as is the case for line B) the terminator resistors. As illustrated in trace B of FIG. 6, the voltage will follow an exponential curve governed by the total RC time constant of the line. The line voltage will decay and when it reaches the input comparator threshold voltage of the receiver, nominally equal to approximately one-half of the full line voltage swing, the receiver will then detect a passive state on the line. The time between when the transmitter goes into a passive state and when the receiver detects the passive state is equal to the time delay on the transmitted signal caused by the exponential response of the trailing edge as compared to the ideal response of a square wave signal.

With continuing reference to FIG. 3, the distributed line capacitances may be considered as lumped sum circuit capacitances. For this equivalent circuit, the RC time constant was calculated in the preferred embodiment to be equal to 1.1 microsecond. This is equivalent to a signal delay of 650 nsec for either line A or line B. This delay is not significant when operating at low data rates of 41.6 Kbps. However, as the bit rate increases to 166.7 Kbps and above, the time constant of the system, or the time delay as seen by the receiver during the detection of the passive state threshold level, is now comparable to the maximum allowable delay. As illustrated in trace B of FIG. 6, the delay time of the signal trailing edge, which is determined by the RC time constant of the transmission line, must be reduced to enable the system to operate at higher bit rates. This reduction can be accomplished by either lowering the capacitance of the nodes/lines or the resistance of the terminators. The capacitance of the nodes is mainly the added capacitance of filter capacitors used for transient/noise suppression and, therefore, it is not desirable to use a lower value. The terminator resistor is chosen to match the characteristic impedance of the transmission media in order to avoid undesirable signal reflections. Therefore, the terminator resistor is constrained to a specific range of values that should not be changed.

Figure 4:
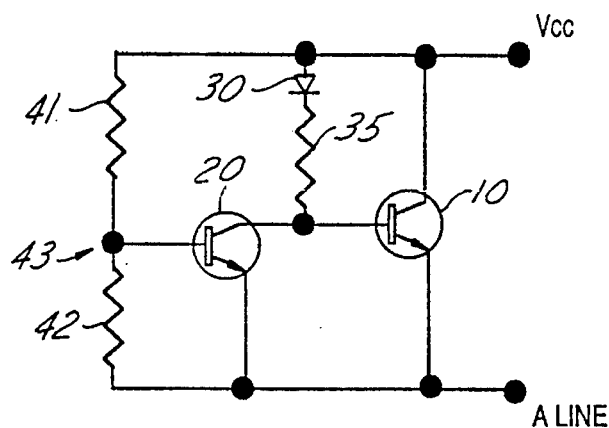
FIG. 4 illustrates a schematic diagram of the first preferred embodiment of the circuit used in the present invention for Line A. The same circuit could be used in Line B by replacing $V_{cc}$ with "B Line" and replacing A Line with "ground".

As illustrated in FIG. 4, the circuit for the first preferred embodiment includes two NPN transistors 10 and 20 (typically a 2N3940), a biasing diode 30 (typically a 1N4001) and three resistors 41 (typically 680 ohms) and 35 (typically 3.9K ohms). Diode 30 provides an offset voltage for biasing transistor 10 such that transistor amplifier 10 does not turn on and conduct substantial current until the voltage across the terminator resistance (shown as the four 180 ohm resistors in FIG. 1) is approximately 1.2 volts. The value of 1.2 volts was chosen to prevent the active terminators from turning on due to ground offset problems in the transmission lines. Transistor 20 includes an input which is coupled to a tap node 43 defined by the junction of the series resistors 41 and 42. The ratio of the resistance of resistor 42 to the sum of the resistance of resistors 41 and 42 determines the turn-on voltage for transistor 20. This turn-on voltage is designed to be approximately 3.5 to 3.8 volts in the preferred embodiment. When transistor 20 turns on, it will present a low impedance load that will draw all of the current from the biasing network, which comprises diode 30 and resistance 35. This loss of biasing current will result in transistor 10 turning off. It should be recognized that the circuit illustrated in FIG. 4 is optimized for placement at Node 1 between $V_{cc}$ and line A as viewed in FIG. 1. A similar circuit would be required at Node 1 between line B and ground. These circuits also would be required for both line A and line B at Node 32 in the multiplex communications system illustrated in FIG. 1.

This active terminator circuit is designed to be connected across the terminator resistance of the multiplex communication system. In another typical application, four terminator resistors of 360 ohms are used for a 16 mode system and four 180 ohms resistors are used for a 32 node system. Two active terminators (one for each line are required for such a 16 node system and four are required for such a 32 node system.

Figure 5:
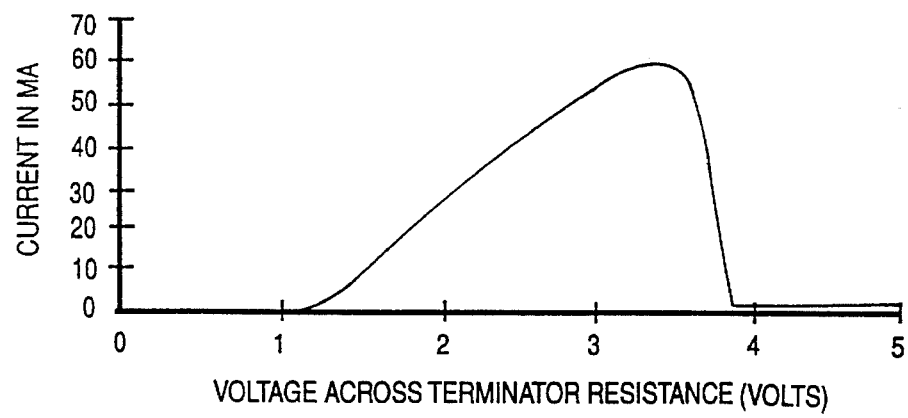
FIG. 5 illustrates the current versus voltage characteristics of the circuit illustrated in FIG. 4 over a range of input terminal voltages.

As the voltage across the terminator resistance varies from 0 to +5 volts, transistor 10 will turn on at approximately 1.2 volts which allows additional current to flow through the effective terminator resistance. When the voltage increases to approximately 3.5 to 3.8 volts, transistor 20 will begin to turn on, thus diverting the base current of transistor 10 which in turn causes transistor 10 to turn off. At approximately 3.9 volts, the current reaches a minimum as transistor 10 is completely turned off. The resulting current to voltage relationship between terminals $V_{cc}$ and line A is illustrated generally in FIG. 5. The simple equivalent resistance ($R_{at}$) of this circuit, at least in the region where the active circuit controls the effective resistance, is equivalent to the slope of the upwardly rising portion of the I-V curve from approximately 1.2 volts to 3.9 volts for the input voltage. This slope is approximately equal to 33 ohms, or approximately $R3/h_{FE(Q2)}$, where $h_{FE(Q2)}$ is the current gain of transistor 10. For the effective terminator resistance having the characteristic resistance illustrated in FIG. 5, the equivalent resistance is equal to 33 ohms or approximately one-third of the effective terminator resistance of 90 ohms as illustrated in FIG. 3.

The effect of having the active terminator circuit connected across each terminator resistance of the multiplex network causes the lowering of the effective resistance and, therefore, the time constant of the transmission line during the transmission of the signal voltage through the transition band, which in the preferred embodiment is defined from approximately 1.2 volts to 3.9 volts as explained above. In the dominant or passive state on the line, the circuit is inactive and has only a negligible effect on the time constant of the multiplex transmission line. The terminator circuitry therefore achieves the effect of lowering the effective terminating resistance from 90 ohms to approximately 33 ohms during the period of time when the digital signal is within the transition band, but without providing any substantial effect during the dominant state where high current is required and without introducing wave reflections due to impedance mismatch during either the dominant or recessive states.

By utilizing two active terminator circuits per line, or a total of four active terminator circuits for the 32 node system, the delay time caused by the RC time constant of the line may be broken into two parts. The first part, which is equal to 0.143 RC, is the time delay when the terminator circuitry is inactive because the signal voltage is between 5.0 volts and 3.9 volts and, therefore, is outside of the transition band. The second portion of the time delay, which is equal to 0.45 (R/R$_{at}$/2)C (where R$_{at}$ is the equivalent resistance of the active terminator), is the time delay introduced when the terminator circuit is active when the digital signal is within the transition band defined between 3.9 volts and 2.5 volts. This operation results in a line resistance equal to R in parallel with the resistance R$_{at}$/2. The maximum delay from this calculation is well within the maximum allowable delay for operation of the multiplex circuit at 166.7 Kbps. In this manner, the addition of the two active terminator circuits for each line will reduce the effective RC time constant to approximately ⅙ of the original time constant.

Figure 6:
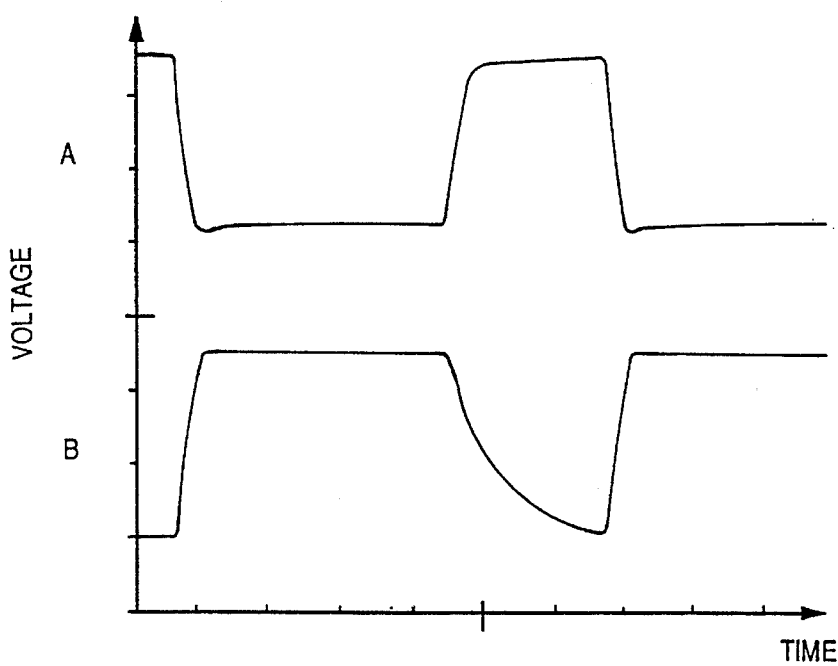
FIG. 6 illustrates two waveforms observed along the multiplex signal lines, with signal trace A illustrating the rise time of the voltage utilizing two circuits on line A in accordance with the present invention, and with trace B illustrating the waveform on line B without the use of the present invention.

FIG. 6 illustrates the digital signal transition waveforms, with trace B illustrating the transition without the active terminator circuits on line B, and with trace A illustrating the waveforms when two active terminator circuits are utilized at each node on line A. The steeper slope or slew rate of the trailing edge in trace A as compared to trace B corresponds to the improved performance of the terminator circuit of the first preferred embodiment.

Therefore, the use of the active terminator circuit reduces the effective resistance at the node only when the circuit is active within the transition band, which is defined approximately as the period when the voltage is transitioning between 3.9 volts and 2.5 volts in the preferred embodiment. This circuit does not have the undesirable effect of changing the transmission line characteristic impedance or providing a mismatch when the signal is in either the dominant or recessive state. Furthermore, the terminator circuit does not increase the drive current requirement of the line driver.

The circuit and method are not limited to pulse width modulated waveform used in SAE J1850. The circuit and method are applicable to all digital waveform where the transition between the two voltage level is important. Encoding schemes such as NRZ will also benefit from these active terminators.

While a preferred embodiment and an operating method in accordance with the present invention have been disclosed, it should be appreciated that other embodiments, such as an integrated circuit implementation or integrated with the line driver circuits, and various modifications to the preferred embodiment may be utilized without departing from the spirit of the invention and the scope of the following claims.

I claim:

1. A system for actively terminating a signal line, having a known terminator resistance, in a multiplex communication system that transmits digital signals, defined by dominant and recessive logic states between a source voltage and a ground potential, comprising:

sensing means coupled to and for sensing along the signal line the transition of a digital signal level within a transition band defined between but not including the dominant and recessive logic states, and first means, coupled to said sensing means and the signal line, for reducing the effective terminator resistance at the termination of the signal line only responsive to the digital signal level being within said transition band, whereby the transition time for the digital signal level moving through said transition band is reduced by reducing the effective resistance and therefore the effective RC time constant at the termination node.

2. The system as described in claim 1 wherein said first means further includes means for deactivating the reduction of the effective terminator resistance in response to the digital signal level being outside of said transition band.

3. The system as described in claim 2 wherein said transition band is defined between and is spaced at least 10% from and between the voltage levels of the dominant and recessive logic states.

4. The system as described in claim 2 wherein said transition band is defined between approximately 1.2 and 3.8 volts for a nominal 5.5 volt dominant state voltage.

5. A circuit for actively terminating a node located along a multiplex signal line, having a known terminator resistance, that transmits digital signals, defined by dominant and recessive logic states between a voltage source and a reference potential, comprising:

first semiconductor amplifier means controlled by an input and having a first output coupled to one of the voltage source or reference potential and a second output coupled to the signal line, a voltage divider comprising first and second resistances connected in series at a tap node and coupled across said first and second outputs of said first semiconductor amplifier means, second semiconductor amplifier means controlled by an input coupled to said tap node of said voltage divider, and having one output coupled to said second output of said first semiconductor amplifier means and another output coupled to said input of said first semiconductor amplifier means, and biasing means coupled between said first output of said first semiconductor amplifier means and said input of said first semiconductor amplifier means, said biasing means for causing said first semiconductor amplifier means to conduct additional current between said first and second outputs responsive to the digital signals varying between said recessive and dominant states within a transition band, with said second semiconductor amplifier means being biased by said voltage divider to drain said bias current and disable said first semiconductor means as the digital signal varies outside said transition band and toward either said dominant or recessive state, whereby the transition time for the digital signal to travel through said transition band is reduced by reducing the effective resistance and therefore the effective RC time constant at the node.

6. The circuit described in claim 5 wherein said biasing means comprises a third resistance coupled in series with a diode, whereby said diode defines a voltage offset from said dominant state before said biasing means begins to supply biasing current to said first semiconductor amplifier means.

7. A method for actively terminating a node located along a multiplex network signal line, having a known terminator resistance, that transmits digital signals defined by dominant and recessive logic states between first and second voltage potentials, comprising the steps of:

a. sensing at the node a transition of the digital signals within a transition band defined between but not including the dominant and recessive logic states, b. reducing the effective terminator resistance at the node along the signal line only responsive to a digital signal level being within the transition band, whereby the transition time for the digital signals to travel though the transition band is reduced by reducing the effective resistance and therefore the effective RC time constant at the node.

8. The method as described in claim 7 further comprising the additional step:

c. deactivating the reduction of the effective resistance responsive to the digital signal level being outside of the transition band.

9. The method as described in claim 8 wherein step a. comprises the step of defining the transition band as spaced at least 10% from and between both the first and second voltage potentials.

10. The method as described in claim 8 wherein step a. comprises the step of defining the transition band as between approximately 1.2 and 3.8 volts where the first and second voltage potentials are approximately 5.5 volts and 0 volts respectively.

* * * * *